J. RIISE.
WHEEL HUB.
APPLICATION FILED OCT. 14, 1916.
1,301,505.
Patented Apr. 22, 1919.
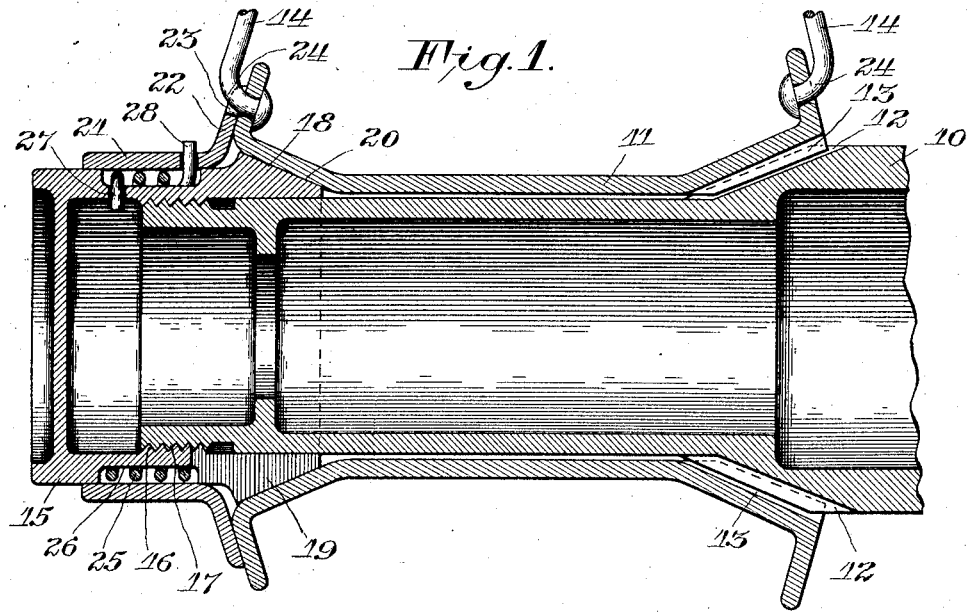
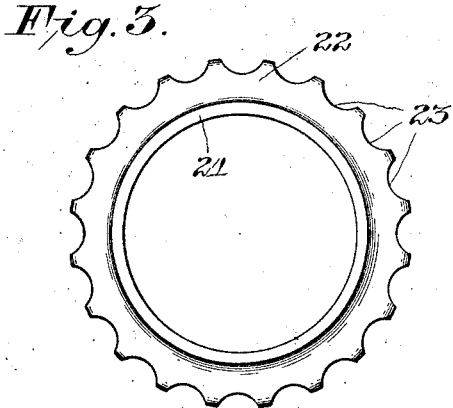
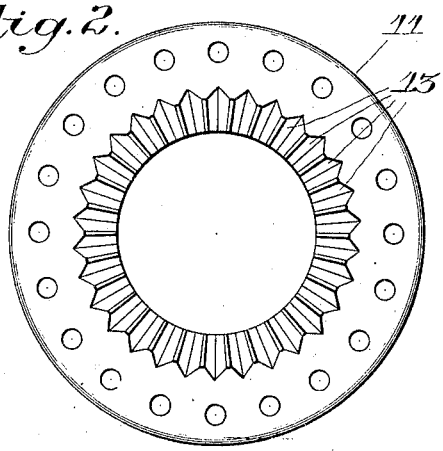
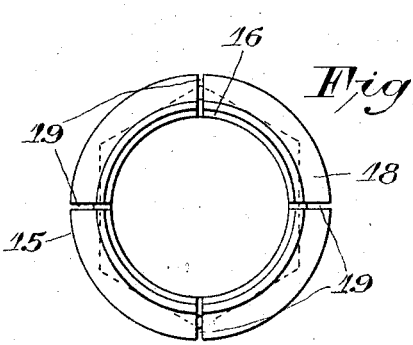
Inventor:
John Riise,
By Chas. L. Byron
Atty.

UNITED STATES PATENT OFFICE.

JOHN RIISE, OF AKRON, OHIO.

WHEEL-HUB.

1,301,505.  Specification of Letters Patent.  Patented Apr. 22, 1919.

Application filed October 14, 1916. Serial No. 125,578.

*To all whom it may concern:*

Be it known that I, JOHN RIISE, a citizen of the Kingdom of Norway, residing at Akron, in the county of Summit and State of Ohio, have invented certain new and useful Improvements in Wheel-Hubs, of which the following is a full, clear, and exact specification.

This invention relates to wheel hubs, and more particularly to wheel hubs for detachable wheels finding application principally, although not necessarily exclusively, in connection with motor vehicles.

One of the objects of this invention is to simplify and improve detachable wheel hubs.

Another object is to insure a positive and secure transmission relation between the driving and driven portions of the hub.

A further object is to improve means for locking the portions of the hub against accidental separation.

And a further object is to provide a hub for detachable wheels adapted to meet all of the requirements for successful commercial operation.

These and other objects are accomplished by providing a wheel hub having inner and outer members with interlockable portions, means for causing an interlocked relation between said members, and locking means to prevent accidental separation of said members.

The invention is illustrated on the accompanying sheet of drawings, in which—

Figure 1 is a longitudinal sectional view of my improved wheel hub;

Fig. 2 is an end view of the removable or detachable hub member withdrawn from its mating member and showing its internally and circumferentially arranged serrations;

Fig. 3 is an end view of the locking ring; and

Fig. 4 is an end view of the positioning and securing nut showing its split or saw cut portions.

The various novel features will be apparent from the following description and drawing, and will be particularly set forth in the appended claims.

This wheel hub includes an inner hub member 10 which will be called the driving member, and also an outer hub member 11 which will be called the driven member. The inner driving member 10 has an inclined beveled portion with inclined, external circumferentially-arranged serrations 12 which are adapted to coöperate or mesh with inclined, internal circumferentially-arranged serrations 13 formed on the inner inclined beveled end of outer driven member 11. This outer hub member 11, which is connected to the rim of the wheel (not shown) by suitable spokes 14, is detachable from the other hub member 10.

As shown in Fig. 1, the serrated portions 12 and 13 of the hub members are in mesh or driving relationship. They are forced into such relationship by a nut 15 having internal threads 16 which coöperate with external threads 17 on the outer end of the driving hub member 10. The inner end of this nut 15 has an inclined or beveled portion 18 which normally presses against an inclined or beveled outer end portion of the driven hub member 11. It is apparent, therefore, that when the outer hub member 11 is slid over the inner member 10, placing their serrated portions 13 and 12 into mesh, and the nut 15 is drawn up, the two parts 10 and 11 will be pressed into a positive and secure motion transmission relationship. At the same time the outer member will be positively centered laterally, radially and circumferentially. All this is accomplished by merely tightening the nut 15. The firmness of seating is in proportion to the degree of force applied to the nut. It will be appreciated that there will never be any lost motion circumferentially when the nut is drawn tight, this result being made possible by the coöperating tapered beveled serrations 12 and 13, the same being true regardless of the amount of wear. The cone-shaped portion 18 of this nut, which acts as a wedge, is split or provided with saw cut portions 19 to insure a better seating for the detachable hub than otherwise would result. It will be noted also that the split cone-shaped portion 18 engages a smooth portion 20 of the outer hub member and not the threaded portion 17 which assists in obtaining the above mentioned desirable results.

In addition, I have provided means for locking the parts together. This locking means includes a ring 21 having an upwardly inclined flange 22 with notches 23 in its periphery which preferably receive the bent lower portions 24 of the spokes 14. The ring 21 is held in locking position by a spring 25 coiled around a recessed portion 26 of the nut 15, one end 27 of the spring being anchored or hooked into the nut 15 and the other end 28 being hooked into the ring 21.

In assembling the parts, the detachable hub 11 is slipped onto the inner hub 10 until the teeth in the serrated portions interlock. The nut 15 which screws onto the inner hub 10 is now applied assembled with lock ring 21 and spring 25. When the nut 15 is turned its inner end acts as a wedge between the hub members 10 and 11, centering and rigidly fastening the detachable hub 11 to inner member 10. After tightening the nut 15, the lock ring 21 should then be turned in the same direction as the nut 15 against the tension created by the spring and placed so that the ring notches 23 snap into locking engagement with the bent ends 24 of spokes 14. When thus properly set, the spring 25 is in tension always tending to tighten the nut 15. With this arrangement, the hub members are locked tight in any position of the nut. Instead of using a wire wheel structure, wood or steel could be used.

It is apparent that there may be modifications of my invention, and it is my intention to cover all such modifications which do not involve a departure from the spirit and scope of my invention as set forth in the following claims.

What I claim as new is:

1. In a hub for detachable wheels, the combination of driving and driven hub members, a wedge nut for pressing said members into operative relation, a lock ring connected to one of said members, and a spring connecting said wedge nut and lock ring, whereby the lock ring may be rotated on said nut to store energy in said spring tending to tighten said nut.

2. In a hub for detachable wheels, the combination of two hub members having interlocking portions, a wedge nut for pressing said members into operative position, said wedge nut having a recess, a lock ring telescoped on said nut and connected to one of said members, and a spring within said recess, housed by said ring and connecting said wedge nut and lock ring.

JOHN RIISE.

Copies of this patent may be obtained for five cents each, by addressing the "Commissioner of Patents, Washington, D. C."